(12) United States Patent
Miyazaki

(10) Patent No.: US 7,807,949 B2
(45) Date of Patent: Oct. 5, 2010

(54) LOCKING MECHANISM FOR SOLDERING IRON

(75) Inventor: Mitsuhiko Miyazaki, Osaka (JP)

(73) Assignee: Hakko Corporation, Osaka (JP)

( * ) Notice: Subject to any disclaimer, the term of this patent is extended or adjusted under 35 U.S.C. 154(b) by 962 days.

(21) Appl. No.: 11/365,216

(22) Filed: Feb. 28, 2006

(65) Prior Publication Data
US 2007/0199975 A1  Aug. 30, 2007

(51) Int. Cl.
 B23K 3/03 (2006.01)
 H05B 1/00 (2006.01)
(52) U.S. Cl. .................................. 219/230; 228/55
(58) Field of Classification Search ............... None
 See application file for complete search history.

(56) References Cited

U.S. PATENT DOCUMENTS

| | | | |
|---|---|---|---|
| 1,706,740 A * | 3/1929 | Powell | 219/530 |
| 2,761,946 A * | 9/1956 | Bronstein | 219/239 |
| 3,121,781 A * | 2/1964 | Schoenwald | 219/237 |
| 3,245,703 A | 4/1966 | Manly | |
| 4,839,501 A | 6/1989 | Cowell | |
| 4,997,121 A | 3/1991 | Yoshimura | |
| 5,329,085 A * | 7/1994 | Cowell et al. | 219/616 |
| 6,054,678 A | 4/2000 | Miyazaki | |
| 6,215,104 B1 | 4/2001 | Kurpiela et al. | |
| 6,710,304 B2 | 3/2004 | Yokoo | |
| 7,060,937 B2 * | 6/2006 | Konishi | 219/229 |
| 7,126,086 B2 * | 10/2006 | Konishi et al. | 219/229 |
| 2004/0232132 A1 * | 11/2004 | Masaki | 219/229 |
| 2005/0092729 A1 * | 5/2005 | Konishi et al. | 219/229 |
| 2005/0101691 A1 | 5/2005 | Hirofumi | |
| 2006/0157467 A1 * | 7/2006 | Shigekawa | 219/229 |

FOREIGN PATENT DOCUMENTS

| | | | |
|---|---|---|---|
| EP | 251271 A * | 1/1988 | |
| EP | 0386948 | 3/1990 | |
| EP | 0 386 948 | 9/1990 | |
| EP | 0499734 | 6/1991 | |
| EP | 1 616 653 | 1/2006 | |
| GB | 2148676 | 3/1984 | |
| WO | WO8000668 A * | 4/1980 | |
| WO | WO 2005/047753 | 5/2005 | |
| WO | WO 2007/100129 | 9/2007 | |

OTHER PUBLICATIONS

International Search Report for PCT/JP2007/054140, mailed Jun. 26, 2007, 3 pgs.
European Search Report for 07737750.5, mailed Mar. 30, 2009, 4 pgs.

* cited by examiner

*Primary Examiner*—Joseph M Pelham
(74) *Attorney, Agent, or Firm*—Squire, Sanders & Dempsey, L.L.P.

(57) ABSTRACT

A cartridge system for a cartridge type soldering iron has a sleeve stopper with hooks and a sleeve which goes over the stopper. The hooks of the sleeve stopper lock with a socket assembly of the soldering iron which connects to an electrical source. A tip cartridge of the soldering iron has a tip retaining mechanism to fix the sleeve stopper with respect to the tip cartridge. The sleeve is made from a non-heat conducting material to protect a user's fingers from heat.

27 Claims, 5 Drawing Sheets

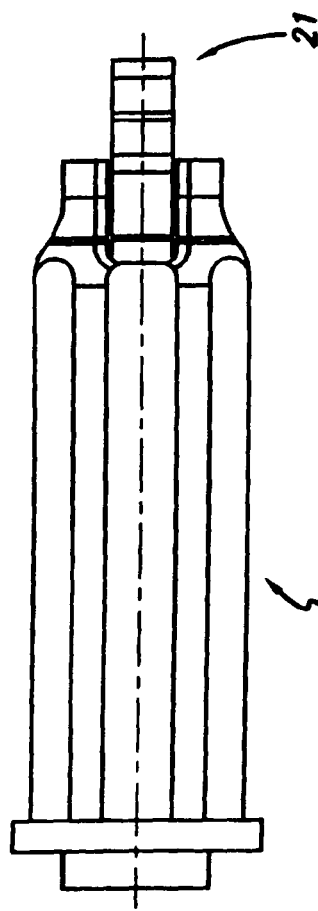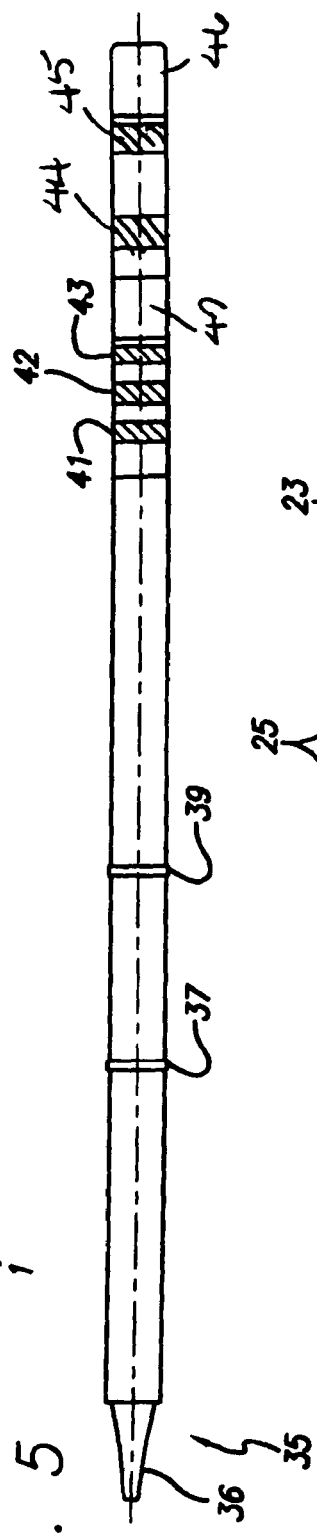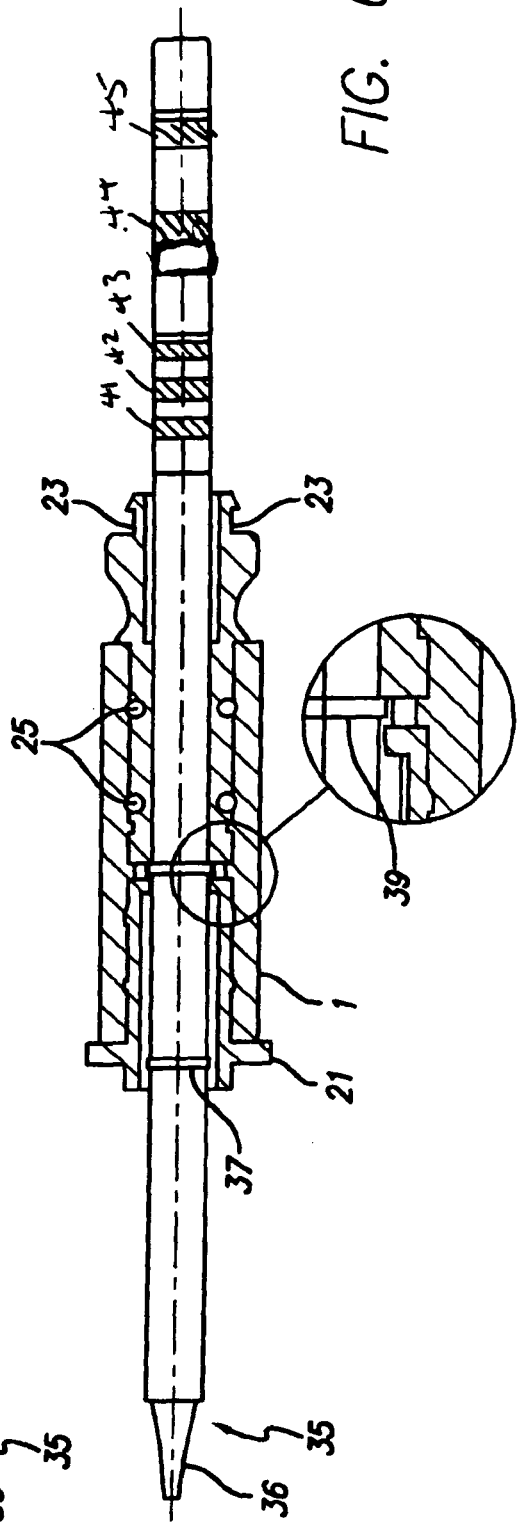

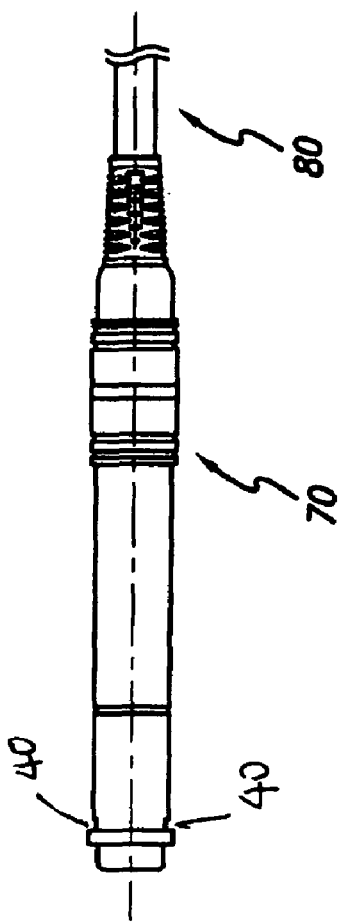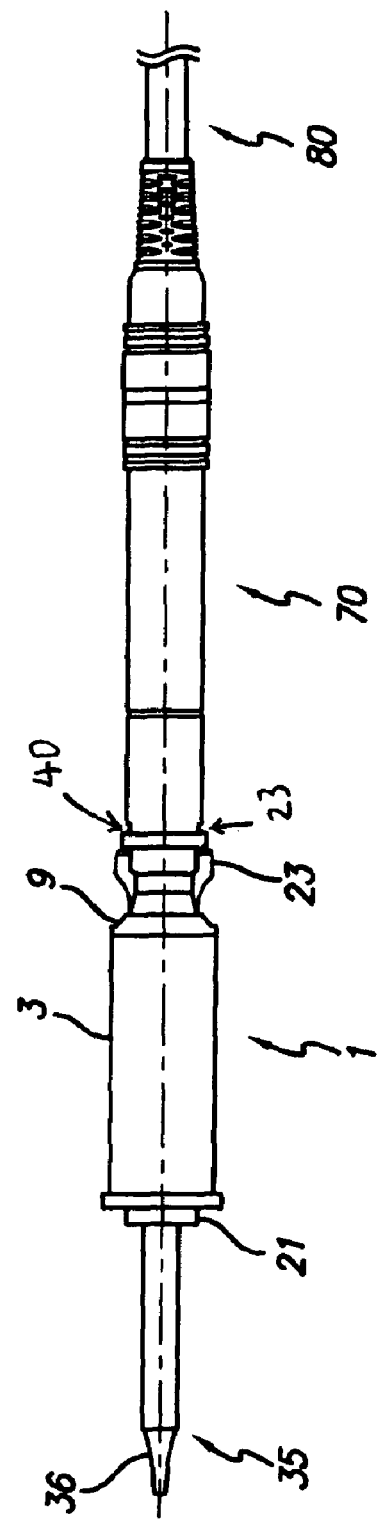
FIG. 7
FIG. 8

LOCKING MECHANISM FOR SOLDERING IRON

FIELD OF THE INVENTION

The present invention relates generally to a cartridge type soldering iron, and in particular to a cartridge type soldering iron having a sleeve assembly and a socket assembly which couple with each other in a locking position.

BACKGROUND OF THE INVENTION

A cartridge type soldering iron of the type at issue here has a releasable and replaceable tip cartridge. For example, a cartridge type soldering iron is disclosed in U.S. Pat. No. 4,839,501 issued to Cowell. Cowell discloses a cartridge type soldering iron which has a hollow cylindrical handle, incorporating an internal coaxial socket assembly, a connection to a power supply, and a cartridge housing support, and a soldering tip, a heater assembly, a tubular housing and a coaxial socket assembly. Another is disclosed in U.S. Pat. No. 6,710,304 to Yokoo, entitled cartridge type soldering iron with a releasable and replaceable handle.

SUMMARY OF THE INVENTION

A cartridge type soldering iron according to the present invention provides a sleeve, a sleeve stopper, a tip cartridge and a socket assembly. The sleeve stopper has a stop and when it is inserted into the sleeve, the sleeve abuts the stop. The sleeve stopper is fixed with respect to the tip cartridge by a tip retaining mechanism provided on the tip cartridge. A socket assembly of the soldering iron defines apertures with which the hooks of the sleeve stopper respectively engage so that the sleeve stopper and the socket assembly are fixed with respect to each other.

The sleeve can be of any color and can have a circular, hexagonal or polygonal circumference, although its shape can vary as long as it is easy to grip and functions well as a sleeve. The sleeve is made of a non-slip material for an easy and accurate grip and generally non-heat conducting for protection of a user's fingers.

The above described and many other features and attendant advantages of the present invention will become apparent from a consideration of the following detailed description when considered in conjunction with the accompanying drawings.

BRIEF DESCRIPTION OF THE DRAWINGS

A detailed description of exemplary embodiments according to the invention will be made with reference to the accompanying drawings.

FIG. 4 shows the hexagonal sleeve of FIG. 1 coupled with the sleeve stopper shown in FIGS. 2 and 3;

FIG. 5 shows a tip cartridge employed in the present invention;

FIG. 6 shows the sleeve stopper and the sleeve engaged with the tip cartridge;

FIG. 7 shows a socket assembly of the soldering iron according to the present invention;

FIG. 8 shows the soldering iron with the sleeve and the sleeve stopper according to the present invention;

DETAILED DESCRIPTION OF THE INVENTION

This description is not to be taken in a limited sense, but is made for the purpose of illustrating the general principles of the present invention. The section titles and overall organization of the present detailed description are for the purpose of convenience only and are not intended to limit the present invention.

Figure 1:
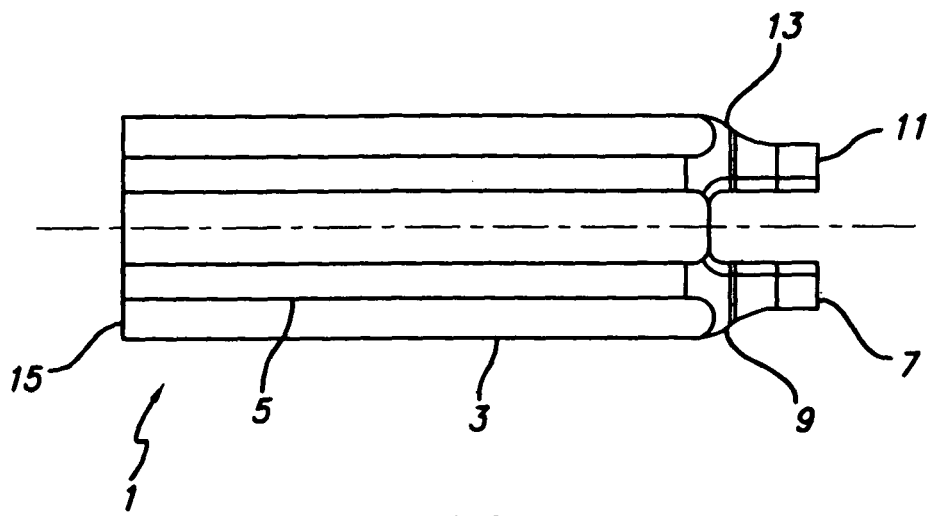
FIG. 1 shows a hexagonal sleeve of a cartridge soldering iron according to the present invention.
Figure 9:
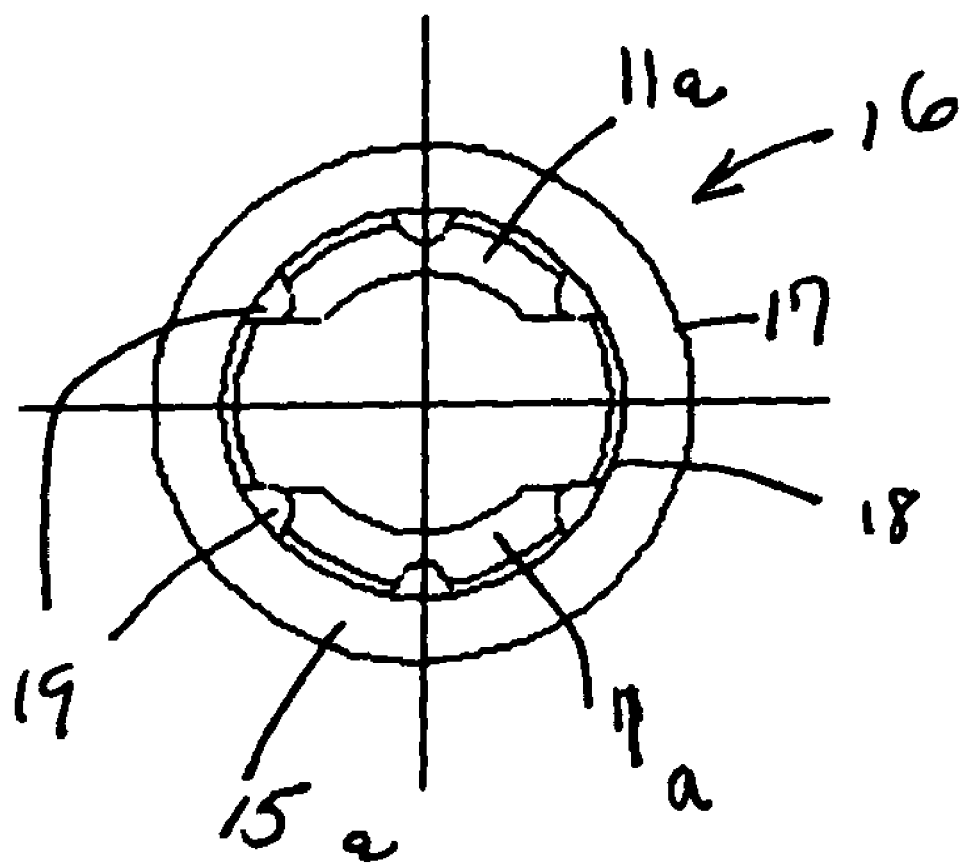
FIG. 9 shows a side view of a circular sleeve of the present invention.

FIG. 1 illustrates by way of example a sleeve 1 for use with a cartridge type soldering iron according to the present invention. The sleeve 1 has a plurality of ridges 3, 5 extending longitudinally, which in this embodiment is hexagonal in circumference. A smooth circular sleeve can also be adopted as well as any other shape as long as the sleeve provides a good grip and is compatible with a below-described sleeve stopper. FIG. 9 shows a cross-sectional view of a circular sleeve 16 of the present invention. The circular sleeve 16 of FIG. 9 is shown from a distal end 15a of the circular sleeve 16. It has a circular outer circumference 17 and another circular interior circumference 18. A plurality of ridges 19 are provided on the interior circumference 18 which run in the longitudinal direction of the circular sleeve 16. There are six ridges 19 provided in this particular embodiment of the circular sleeve 16 shown in FIG. 9. These ridges 19 function as a heat insulator to retard the heat conduction from the heater.

In the hexagonal sleeve 1 of FIG. 1, a distal end 15 ends abruptly while the other end slopes down to a narrower circumference at shoulders 9 and 13 and extends into two tips 7, 11, respectively. In FIG. 9, the circular sleeve 16 has corresponding tips 7a and 11a.

In the embodiments of the present invention shown here, the sleeves 1 and 16 are made of polypropylene. The sleeves 1 and 16 may also be made of a variety of materials that are known to those skilled in the art. These materials include rubber, elastomer and polyolefin and other plastics. Further, an anti-static material and/or an anti-microbial material may be added. Additionally, instead of polypropylene, cork can be used in its place.

Figure 2:
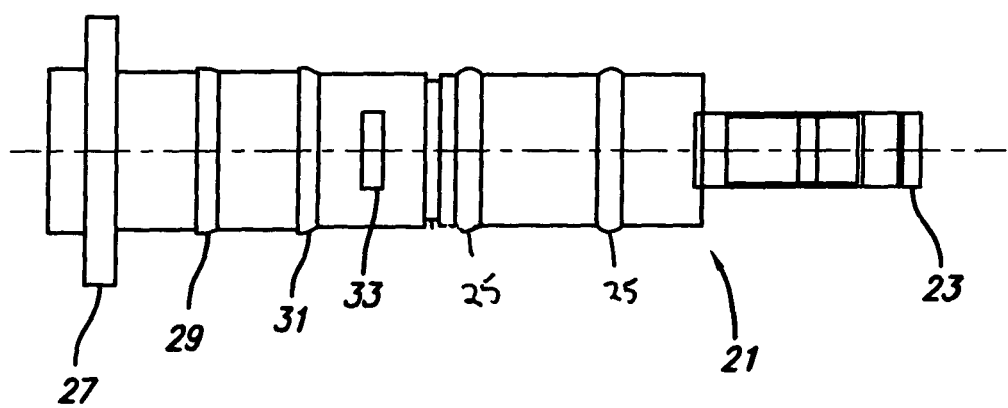
FIG. 2. shows a sleeve stopper according to the present invention.
Figure 3:
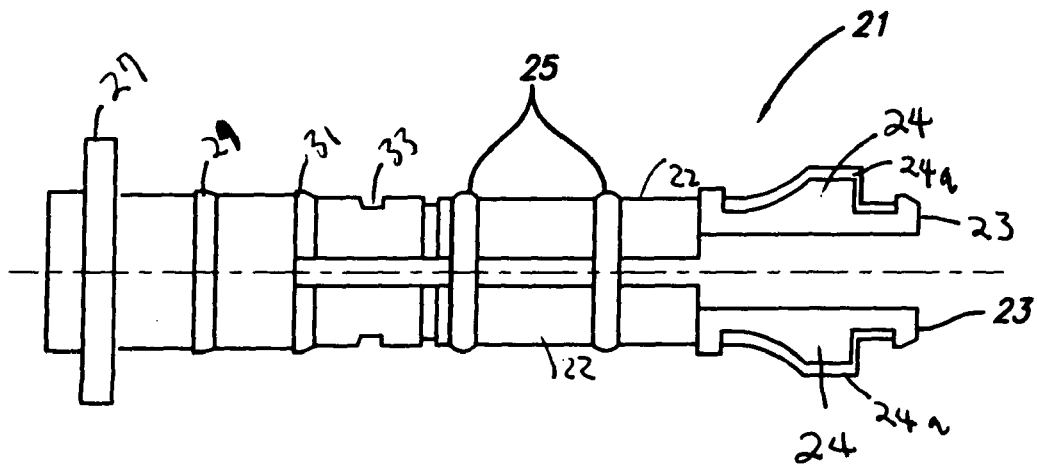
FIG. 3 shows the sleeve stopper of FIG. 2 in another view.

FIGS. 2 and 3 show the sleeve stopper 21 having a stop 27 at one end and a pair of hooks 24 at the other end. The hooks 24 have buttons 24a and hook tips 23. A pair of steps 29 and 31 is provided on the body of the sleeve stopper 21 to help provide a snug fit with the sleeve 1. The sleeve stopper 21 defines a pair of apertures 33. A couple of O rings 25 are provided as well. The sleeve stopper 21 slidably couples with the sleeve 1 where hooks 24 are positioned between the tips 7, 11, respectively, as shown in FIG. 4. When the sleeve 1 is inserted over the sleeve stopper 21, the end 15 of the sleeve 1 abuts and is fixed against the stop 27 of the sleeve stopper 21.

The sleeve stopper 21 may be made from an insulating material, for instance, if the heat conduction is such that the sleeve stopper area gets hot from the heat of the tip. The stop 27 of the sleeve stopper 21 may be made from a temperature-sensitive material so that as the soldering iron tip heats up, it indicates to the user of its readiness or burn risk depending on a degree of temperature sensitivity by changing color.

FIG. 5 shows a tip cartridge 35 employed in the present invention. The tip cartridge 35 has two ridges 37 and 39 defined in its body and bar codes 41, 42, 43. The bar codes 41, 42, 43 identify the type of tip cartridge and its corresponding temperature requirement and are provided on a stainless portion 47 of the tip cartridge 35. A couple of contact points 44 and 45 are provided on a non-electrically conductive material 46. The ridge 39 on the tip cartridge 35 is used as a tip retaining mechanism. When the tip cartridge 35 is inserted into the sleeve stopper 21, the ridge or the tip retaining mechanism 39 comes to rest at a certain point of the sleeve stopper 21 as can be seen in a cross-sectional view of FIG. 6. The tip cartridge 35 in this way is fixed with respect to the sleeve stopper 21. The O rings 25 bind the arms 22 to the extent shown in FIG. 3, which leaves a predetermined amount of space between the arms 22. The arms 22 are bound to such an extent so that the hooks 24 slidably hook with the socket assembly 70 at the corresponding apertures 40 and stay hooked through normal use of the solder iron. The O rings 25 also bind to retain and secure the tip cartridge 35 with enough force for the tip cartridge 35 to slidably fit within the sleeve stopper 21 but at the same time to stay secured and not come apart as it sometimes did in prior art systems.

Figure 10:
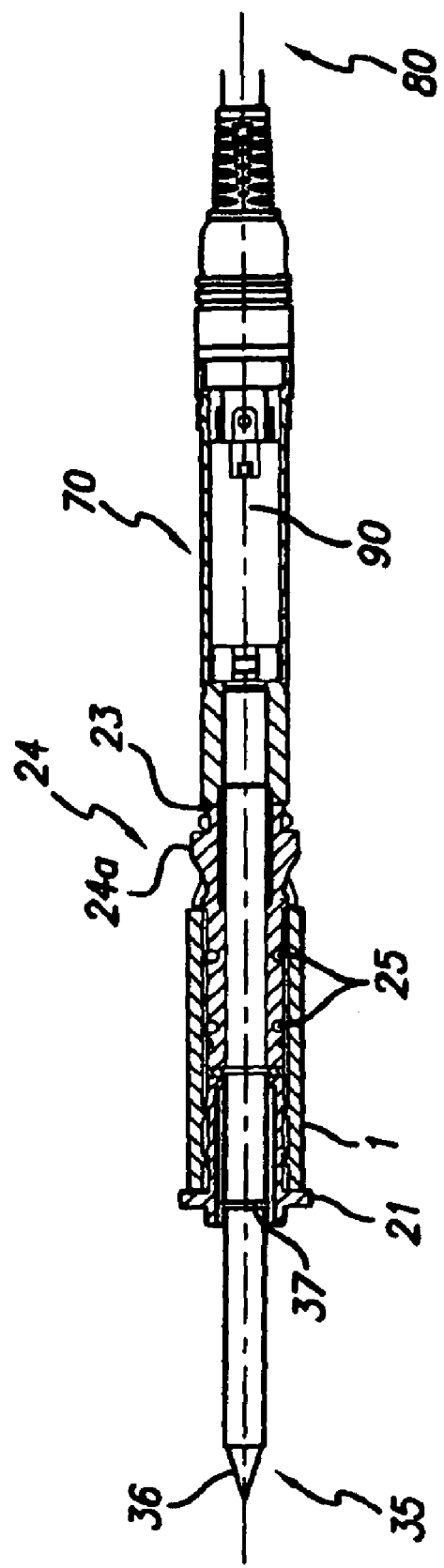
FIG. 10 shows a cross-sectional view of the soldering iron of the present invention.

Next, the sleeve stopper 21 is locked with the socket assembly 70 in a following manner. As described above, the sleeve stopper 21 according to the present invention is provided with a pair of hooks 24. When the sleeve assembly composed of the sleeve stopper 21 and the sleeve 1 holds the tip cartridge 35, and the whole combination is inserted into the socket assembly 70, the hook ends 23 slidably lock with the apertures 40 of the socket assembly 70. A cross sectional view of the assembled soldering iron is shown in FIG. 10.

The socket assembly 70 has a plug (not shown) at the end of an electrical cord 80 to connect to the power source. FIG. 10 shows the socket assembly 70 in its cross-sectional view and shows a connector 90. The contact points 44 and 45 of the tip cartridge 35 are connected with the connector 90 for supplying the power to the tip cartridge 35.

In prior art systems, a socket assembly sometimes comes apart from the rest of the soldering iron. Such disconnection is caused by insufficient fastening or coupling between the socket assembly and the rest of the cartridge type soldering iron. This results because the tip cartridge by itself or together with the rest of the cartridge type soldering iron are simply inserted into the socket assembly and has insufficient mechanical hold onto the socket assembly.

Unlike those types of cartridge type soldering irons, the soldering iron according to the present invention provides a firm, sturdy mechanical coupling between the sleeve assembly on one hand and the socket assembly on the other, through the above-described provision of the locking mechanism. Therefore, the entire cartridge type soldering iron can stay together, and at the same time, the assembly of the tip cartridge with the sleeve stopper and the sleeve may easily replaced.

The cartridge soldering iron of the present invention is easy to use because the locking mechanism is located above the sleeve 1 and out of the way of the grip. Its parts such as the buttons 24*a*, hook tips 23 are very small and almost flush with the rest of the longitudinal covered surface of the soldering iron.

The practical embodiments described herein are mere examples for illustrating the art of the invention, and the invention is not limited to the foregoing examples alone but should be interpreted in a wider sense including the changes and modifications falling within the scope and spirit of the invention as well as the descriptions in the claims.

What is claimed is:

1. A cartridge type soldering iron comprising:
   a socket assembly connected to an electrical source;
   a tip cartridge slidably coupled to and in electrical contact with the socket assembly; and
   a sleeve stopper having a first arm, a second arm, a slot between the first and second arms, and at least one hook disposed on one or both of the first and second arms, the sleeve stopper slidably coupled to the tip cartridge;
   wherein a ridge on the tip cartridge is disposed within an aperture in the sleeve stopper, and the at least one hook is engaged on the socket assembly.

2. A cartridge type soldering iron according to claim 1, further comprising a sleeve, the first and second arms at least partially disposed within the sleeve, the at least one hook disposed outside the sleeve.

3. A cartridge type soldering iron according to claim 1, wherein the socket assembly has a pair of apertures that locks with the sleeve stopper.

4. A cartridge type soldering iron according to claim 2, wherein the sleeve has a hexagonal circumference.

5. A cartridge type soldering iron according to claim 2, wherein the sleeve has a polygonal circumference.

6. A cartridge type soldering iron according to claim 2, wherein the sleeve has a circular circumference.

7. A cartridge type soldering iron according to claim 2, wherein the sleeve is made of carbon-impregnated foam.

8. A soldering iron according to claim 2, wherein the sleeve is made of rubber.

9. A soldering iron according to claim 2, wherein the sleeve is made of elastomers.

10. A soldering iron according to claim 2, wherein the sleeve is made of polypropylene.

11. A soldering iron according to claim 2, wherein the sleeve contains an anti-static material.

12. A soldering iron according to claim 2, wherein the sleeve contains an anti-microbial material.

13. A soldering iron according to claim 2, wherein the sleeve is made of plastics.

14. A cartridge type soldering iron according to claim 2, wherein the sleeve is made of cork.

15. A cartridge type soldering iron according to claim 1, wherein the at least one hook has a tip and a button, the tip engages the socket assembly, and the button protrudes radially outward from the socket assembly when the sleeve stopper is locked with the socket assembly.

16. A cartridge type soldering iron according to claim 1, wherein the at least one hook is a pair of hooks.

17. A cartridge type soldering iron according to claim 1, wherein the at least one hook is three hooks and wherein the socket assembly has three apertures for the hooks.

18. A cartridge type soldering iron according to claim 1, wherein the hook includes a button and an end portion, and a portion of the socket assembly is disposed between the button and the end portion of the hook.

19. A cartridge type soldering iron according to claim 1, wherein the sleeve stopper includes a forward end and a rear end, the at least one hook is disposed at the rear end, the tip cartridge includes a portion with a contact point that supplies power from the socket assembly to the tip cartridge, and the portion extends out from the rear end of the sleeve stopper.

20. A two-part holder for use with a cartridge type soldering iron having a replaceable tip cartridge, comprising:
    a sleeve having a first end and a second end, the first end defining a first tip end and a second tip end;
    a sleeve stopper that holds the tip cartridge, the sleeve stopper having a pair of hooks and a stop, each of the hooks having a tip and a button, the sleeve stopper being able to couple with the sleeve wherein the second end abuts the stop of the sleeve stopper and the first end accepts the hooks between the first tip end and the second tip end respectively, and a tip retaining mechanism fixably retains the sleeve stopper; and a socket assembly that locks with the sleeve stopper wherein the hook tips engage with the socket assembly.

21. A soldering iron locking mechanism for use with a cartridge type soldering iron having a tip cartridge and a socket assembly, comprising:

a sleeve stopper having a first arm, a second arm, a slot between the first and second arms, and at least one of the first and second arms having a hook, the sleeve stopper configured to slidably couple with the tip cartridge and the hook configured to lock with the socket assembly; and a sleeve covering a portion of the sleeve stopper, wherein the first and second arms are at least partially disposed within the sleeve, and the hook is disposed outside the sleeve.

22. A soldering iron locking mechanism according to claim 21, wherein the sleeve stopper includes a stop feature protruding from portions of the sleeve stopper adjacent the stop feature, and the sleeve is confined between the stop feature and the hook.

23. A cartridge type soldering iron comprising:

a tip cartridge having a tip retaining mechanism, the tip cartridge sized to fit into a socket assembly; and a sleeve assembly that engages the tip cartridge by the tip retaining mechanism, wherein the sleeve assembly and the tip cartridge form a combined assembly that is retained on the socket assembly, wherein the sleeve assembly includes a sleeve and two arms spaced apart by a slot, the arms are at least partially disposed within the sleeve, a hook is disposed on at least one of the arms, and the hook is disposed outside of the sleeve and is configured to engage the socket assembly, wherein the tip retaining mechanism includes a ridge protruding radially outwardly from portions of the tip cartridge adjacent the ridge, the ridge disposed within an aperture through one of the arms.

24. A cartridge type soldering iron according to claim 23, wherein the sleeve assembly includes a forward end and a rear end, the hook is disposed at the rear end, the tip cartridge includes a portion with an electrical contact, and the portion extends out from the rear end of the sleeve assembly.

25. A cartridge type soldering iron comprising:

a socket assembly configured for connection to an electrical source;

a sleeve;

a sleeve stopper coupled into to the sleeve, the sleeve stopper having at least one hook disposed outside the sleeve; and a tip cartridge slidably coupled to and in electrical contract with the socket assembly, and slidably coupled into the sleeve stopper, wherein the at least one hook locks with the socket assembly.

26. A cartridge type soldering iron according to claim 25, wherein the sleeve stopper includes an aperture into which an outer surface of the tip cartridge is inserted.

27. A cartridge type soldering iron according to claim 25, wherein the at least one hook is flush with the rest of the longitudinal covered surface of the soldering iron.

* * * * *